3,095,322
COLOR STABILIZED FIBERS AND PROCESS FOR PREPARING SAME

Jan Z. Sadowski and Robert E. Wagner, Wilmington, Del., assignors to E. I. du Pont de Nemours and Company, Wilmington, Del., a corporation of Delaware
No Drawing. Filed Mar. 20, 1961, Ser. No. 96,651
13 Claims. (Cl. 117—138.8)

This invention relates to color-stabilized shaped articles and to a process for preparing such shaped articles from polyurethane compositions. More particularly, the invention relates to a process for preventing discoloration of spandex fibers upon exposure to oxides of nitrogen and other fumes.

It is known that spandex fibers on storage and upon exposure to atmospheric conditions are subject to gas fume discoloration which results in an undesirable yellowing of the fibers. While the discoloration may be offset to some extent by tinting or by the use of other masking agents, such materials often cause the fibers to display undesirable color characteristics since they merely mask and do not inhibit the formation of the yellow color.

It is, therefore, an object of the present invention to provide color-stabilized shaped articles of polyurethane compositions. It is a more particular object of this invention to provide spandex fibers which do not develop a yellow color upon exposure to oxides of nitrogen and other fumes. A further object of this invention is to provide a treating composition and process for treating spandex fibers which inhibit discoloration of the fibers upon exposure to fumes. These and other objects will become apparent from the following detailed description.

The objects of this invention are accomplished by providing spandex fibers having a stabilizing quantity of benzanilide incorporated therein. The amount of benzanilide may vary within a fairly wide range with amounts from a fraction of 1%, e.g., 0.1%, to 10% or more by weight providing a stabilizing effect. The optimum quantity for a particular fiber will vary and for reasons of economy should, of course, be kept as low as possible. The selection of the optimum quantity will depend on a number of factors such as the particular type of spandex fiber, the fiber geometry, porosity, rheology, as well as the particle size of benzanilide when applied from aqueous dispersions. Preferably, amounts from about 1% to about 7% by weight are utilized.

In general, the benzanilide may be incorporated in the fiber according to procedures similar to those used for incorporating dyestuffs in the fibers. For example, the benzanilide may be dissolved in a suitable organic solvent to which the fibers are inert, i.e., non-reactive, and the fibers immersed in the treating solution. Alternatively, the benzanilide may be prepared in a particulate form, e.g., corresponding to an average particle size not coarser than about 100-mesh (U.S. sieve size series), by conventional dry-grinding in a ball mill or colloid mill. The particles may then be dispersed in an aqueous medium, using one or more dispersing agents, and applied to the fiber by passing it through a treating bath containing the dispersed particles. When applying the benzanilide to the fibers, strongly acidic or basic conditions should be avoided. Preferably, a pH in the range from about 5 to 9 is maintained.

In a preferred embodiment of the process, a treating bath is prepared which is comprised of an aqueous dispersion which contains from about 1% to about 5% dispersed benzanilide. The spandex fibers, or a fabric containing such fibers, may be immersed in the bath and the temperature raised to from 130° F. to 180° F. The fiber is held in the bath for a period of time sufficient to insure that a stabilizing quantity of benzanilide is retained by the fiber upon being removed from the treating bath. The time may vary from a few minutes to an hour or more.

The term "spandex fiber" is used in its generic sense to mean a manufactured fiber in which the fiber-forming substance is a long chain synthetic elastomer comprised of at least 85% of a segmented polyurethane. It is not intended, however, that the invention be limited to fibers of such segmented polyurethanes since the stabilization is achieved with other shaped articles such as films and the like. The segmented polyurethanes which provide spandex fibers contain the recurring linkage —OCONH—. The preferred spandex fibers are those prepared from segmented polyurethanes in which the urethane nitrogen is joined to an aromatic radical. The segmented polyurethanes may also contain the ureylene link —NHCONH—. Generally speaking, the polyurethanes are prepared from hydroxyl-terminated prepolymers such as hydroxyl-terminated polyethers and polyesters of low molecular weight. Reaction of the prepolymer with a molar excess of organic diisocyanate, preferably an aromatic diisocyanate, produces an isocyanate-terminated polymeric intermediate which may then be chain extended with a difunctional active hydrogen-containing compound such as water, hydrazine, organic diamines, glycols, amino alcohols, etc.

Among the segmented polyurethanes of the spandex type are those described in several patents among which are U.S. Patents 2,929,800, 2,929,801, 2,929,802, 2,929,804, 2,953,839, 2,957,852, and Re. 24,689. As described in the aforementioned patents, the segmented polyurethane elastomers are comprised of low-melting segments having a melting point below about 50° C. and a molecular weight above about 600, and contain from about 5% to 40% of high-melting segments derived from a polymer having a melting point above about 200° C. in the fiber-forming molecular weight range. Most of the polyurethanes have elongations greater than 150%, tensile recovery of over 90%, and a stress decay of less than 20%.

In the following examples, which further illustrate this invention, the fume-fading tests are carried out according to AATCC Standard Test Method 23–1957, as described at pages 104–106 of The Technical Manual of the American Association of Textile Chemists and Colorists (1960).

The fiber color value, "b" value, referred to in the examples is determined from colorimetric data obtained by analyzing continuous filament and fabric samples which are about three inches square. The reflectance ratios of the samples in the green and blue filter settings of a colorimeter are measured, using a Model IV Color Master Differential Colorimeter, manufactured by Manufacturing Engineering and Equipment Company, Hatboro, Pennsylvania, and calibrated against the manufacturer's standard reference plates and the National Bureau of Standard's certified reflectance plates. Three readings are taken on each of the samples, one of the measurements for the filament sample being made with the sample rotated 90° from the position of the first reading. The "b" values are then calculated from the average of three readings, using the following formula $$"b" = 42.34 G^{1/3} B^{1/3}$$

where G represents the reflectance ratio with the green filter and B represents the reflectance ratio with the blue filter.

EXAMPLE I

A 280-denier coalesced elastomer monofil was prepared according to the procedure of Example I of Arvidson and Blake, U.S. S.N. 709,445, filed January 17, 1958. This fiber was made without the titanium dioxide and N,N-diethyl beta-aminoethyl methacrylate of that example.

A boiled-off, dried skein of this fiber weighing 5.0 grams was soaked for one minute in 100 ml. of a 3.0 weight percent solution of benzanilide in acetone at room temperature. The treated skein was allowed to dry in air at room temperature for two hours. This treated skein and a similar skein not treated with benzanilide were measured for "b" value according to the procedure described above.

The two samples were subjected to the fume-discoloration test described earlier. After this exposure they were allowed to cool and were again measured for "b" value. Results of this experiment were as follows:

|  | "b" Values | |
| --- | --- | --- |
|  | As Prepared | After Fume Exposure |
| Sample With Benzanilide | 2.2 | 21.6 |
| Control | 10.1 | 52.3 |

The entire experiment was repeated with the exception that on oil finish was applied to the spun yarn in place of talc. This finish consisted of 75% No. 50 mineral oil, 5% blown peanut oil, 10% acetylated castor oil, and 10% zinc stearate, the finish being applied to the level of 10% based on fiber weight. Data obtained in this experiment were as follows:

|  | "b" Values | |
| --- | --- | --- |
|  | As Prepared | After Fume Exposure |
| Sample With Benzanilide | 2.0 | 19.1 |
| Control | 7.0 | 41.6 |

Both experiements showed the presence of benzanilide to reduce the color of the elastomer fiber both before and after exposure to fumes.

EXAMPLE II

The procedure of Example I was followed with the additional feature that the spinning solution contained 5% titanium dioxide and 5% N,N-diethyl beta-aminoethyl methacrylate, both amounts based on fiber weight. Incorporation of these ingredients was accomplished by the procedure of the Arvidson and Blake reference mentioned in Example I.

The fibers containing no finish (talc applied, but boiled off) showed the following "b" values.

|  | "b" Values | |
| --- | --- | --- |
|  | As Prepared | After Fume Exposure |
| Sample With Benzanilide | 5.4 | 14.3 |
| Control | 6.4 | 28.4 |

Fibers prepared with application of oil finish showed the following:

|  | "b" Values | |
| --- | --- | --- |
|  | As Prepared | After Fume Exposure |
| Sample With Benzanilide | 5.8 | 12.6 |
| Control | 7.1 | 29.7 |

As in Example I application of benzanilide reduced fiber color as measured by "b" value both before and especially after exposure to fumes. Comparison of the data of this example with those of Example I shows that the effects of benzanilide treatment are additive to those obtained by incorporation of titanium dioxide and N,N-diethyl beta-aminoethyl methacrylate in the spun fiber.

The amount of benzanilide applied to the fibers by the treatments of Examples I and II ranged from 7% to 8%, as determined by measurements of gain in the fibers' weight. For example, the fibers prepared with application of oil finish in Example II showed a pick-up of 7.1% benzanilide.

The remaining examples illustrate application of the invention to fabrics, in a manner such as might comprise a step in commercial fabric finishing. The fabric samples used in these examples were first scoured in a standard manner. The general procedure was:

(1) Dissolve the dispersing agents in water at temperatures from 110° F. up to about 130° F.
(2) Add the active agent.
(3) Introduce the fabric sample.
(4) Raise the temperature slowly to the desired treatment temperature.
(5) Maintain for one hour.
(6) Rinse the fabric sample carefully and dry. The method of drying is not critical; both air drying and oven drying were used in these examples at temperatures up to 120° F. A probable maximum drying temperature without injury to the fabric is 230° F. The pH values given in the following examples were maintained within limits of ±0.2.

After treatment the samples were exposed to the fume discoloration test previously described. Extent of discoloration was measured in terms of "b" values defined earlier.

Instron tests of yarn samples taken from the fabrics after treatment showed that the treatment of this invention had no adverse effect on yarn or fabric physical properties.

EXAMPLE III

A previously scoured leno fabric comprising about 45% of the spandex yarn of Example II and about 55% of nylon yarn was treated in an aqueous bath of the following composition:

(A) 5 g./l. of a material comprised of 40% benzanilide, 40% dimethylterephthalate, 9.5% sodium sulfate, and 0.5% sodium lauryl sulfate, and reduced to a particle size finer than 100 mesh;
(B) 0.5 g./l. of a sodium alkyl ($C_{16}$–$C_{20}$) sulfonate;
(C) 0.25 g./l. of a sodium sulfate ester of ethylene oxide and long chain ($C_{16}$–$C_{18}$) unsaturated alcohol condensate;
(D) 0.5 g./l. of the sodium salt of the condensation product of naphthalene sulfonic acids and formaldehyde.

The bath containing these agents was brought to 110° F. and the fabric introduced at a liquor-to-fabric ratio of 20:1 (by weight) at pH 7.2. The bath was brought to the boil and maintained at the boil for one hour. The sample was rinsed well and dried. The treated fabric and an untreated control were exposed to the fume discoloration test previously described. The treated sample showed a considerable reduction in amount of fume discoloration as compared with the control sample, indicated by "b" values of 16.60 for the control sample and 7.43 for the treated sample after exposure.

When the procedure of this example was repeated at pH 7.7, the treated sample again was markedly less discolored than the untreated control after exposure to fumes, as shown by "b" values of 17.88 for the control sample and 7.02 for the test sample.

EXAMPLE IV

The procedure of Example III was repeated except that the spandex yarn was the polyester-based segmented polyurethane described in Example I of U.S. 2,953,839. The treated fabric showed substantially less discoloration and untreated control when exposed to the fume test ("b" values of 10.54 for the control and 7.30 for the treated sample).

EXAMPLE V

Table 1 shows additional application of the invention using the bath system of Example III. The concentration of ingredients (B), (C), and (D) was maintained at the same levels as in Example III. The concentration of ingredient (A) was varied as shown in the table. The bath-to-fabric ratio was also varied over the range 20:1–50:1.

Table 1

| Sample No. | Ingredient (A), g./l. | pH | Temp., °F. | Bath/Fabric, by Wt. | "b" value |
|---|---|---|---|---|---|
| Untreated Fabric | | | | | 18.48 |
| 1 | 0.5 | 5.0 | 150 | 20/1 | 13.83 |
| 2 | 0.5 | 7.0 | 150 | 20/1 | 13.36 |
| 3 | 0.5 | 9.0 | 150 | 20/1 | 11.87 |
| 4 | 1.5 | 5.6 | 150 | 20/1 | 13.35 |
| 5 | 1.5 | 7.0 | 150 | 20/1 | 10.40 |
| 6 | 1.5 | 9.0 | 150 | 20/1 | 9.62 |
| 7 | 1.5 | 7.0 | 180 | 20/1 | 9.61 |
| 8 | 1.5 | 9.0 | 180 | 20/1 | 9.42 |
| 9 | 1.5 | 5.0 | 212 | 20/1 | 14.50 |
| 10 | 1.5 | 7.0 | 212 | 20/1 | 9.84 |
| Untreated Fabric | | | | | 16.72 |
| 11 | 0.6 | 7.9 | 180 | 50/1 | 10.44 |
| 12 | 0.8 | 7.9 | 180 | 50/1 | 9.25 |
| 13 | 1.0 | 7.8 | 180 | 50/1 | 9.07 |
| Untreated Fabric | | | | | 18.31 |
| 14 | 2.5 | 7.0 | 212 | 30/1 | 12.16 |

EXAMPLE VI

Table 2 shows further application of the invention in which ingredient (A) of Example III, a mixture containing benzanilide, was replaced by benzanilide alone. Ingredients (B), (C), and (D) of Example III and sodium sulfate were variously included as shown in the table. This table shows, not surprisingly, that to achieve a given level of fume stabilization, the concentration of benzanilide in the bath must be increased when liquor-to-fabric ratio is decreased.

Table 2

| Sample | Bath Composition, g./l. | | | | | pH | Temp., °F. | Liquor/fabric by Wt. | "b" Value |
| | Benzanilide | (B) | (C) | (D) | Na₂SO₄ | | | | |
|---|---|---|---|---|---|---|---|---|---|
| Untreated fabric | | | | | | | | | 18.48 |
| 1 | 0.125 | 0 | 0.25 | 0.25 | 0 | 7.7 | 212 | 40/1 | 14.45 |
| 2 | 0.25 | 0 | 0.25 | 0.25 | 0 | 5.0 | 150 | 40/1 | 11.19 |
| 3 | 0.25 | 0 | 0.25 | 0.25 | 0 | 5.0 | 212 | 40/1 | 12.28 |
| 4 | 0.75 | 0 | 0.25 | 0.25 | 0 | 7.7 | 212 | 40/1 | 13.36 |
| Untreated fabric | | | | | | | | | 16.72 |
| 5 | 0.6 | 0 | 0.25 | 0 | 0.3 | 8.6 | 180 | 50/1 | 6.93 |
| 6 | 0.6 | 0 | 0 | 0.5 | 0.3 | 7.7 | 180 | 50/1 | 6.73 |
| 7 | 0.6 | 0.5 | 0 | 0.5 | 0.3 | 8.6 | 180 | 50/1 | 10.28 |
| 8 | 0.6 | 0.5 | 0.25 | 0.5 | 0.3 | 8.5 | 180 | 50/1 | 10.20 |
| Untreated fabric | | | | | | | | | 18.31 |
| 9 | 1.0 | 0.5 | 0.25 | 0.5 | 0 | 7.0 | 212 | 30/1 | 12.98 |
| 10 | 2.0 | 0 | 0.25 | 0 | 0 | 7.0 | 212 | 30/1 | 9.09 |
| 11 | 2.0 | 0.5 | 0.25 | 0.5 | 0 | 7.0 | 212 | 30/1 | 8.22 |
| 12 | 5.0 | 0.5 | 0.25 | 0.5 | 0 | 7.0 | 212 | 30/1 | 12.64 |
| 13 | 5.0 | 0.5 | 0.25 | 0 | 0 | 7.0 | 212 | 30/1 | 10.58 |
| 14 | 5.0 | 0.5 | 0 | 0.5 | 0 | 7.0 | 212 | 30/1 | 10.26 |

EXAMPLE VII

Further illustration of the application of benzanilide alone is given in the following series. The scoured leno fabric of Example III was used. In addition to the indicated amounts of benzanilide, the bath in each test contained 0.14 g./l. Na₂SO₄ and 0.23 g./l. of ingredient (C) of Example III. Bath/fabric ratio was 35:1; pH was 7.0–8.0; treatment was for one hour at 180° F.

| Sample | Benzanilide, g./l. | "b" value Before fume | "b" value After fume |
|---|---|---|---|
| Untreated fabric | 0.0 | 3.45 | 15.78 |
| 1 | 0.86 | | 4.34 |
| 2 | 1.13 | 1.42 | 3.02 |
| 3 | 1.4 | | 4.23 |

As in Examples I and II, application of benzanilide reduced fiber color as measured by "b" value both before and especially after exposure to fumes. Earlier data on bare yarns had indicated that good fume stabilization was achieved when benzanilide was present to the extent of 3.3–4.3% of the weight of the fiber. This finding was confirmed by the tests of this example. For example, Sample 3 with a "b" value of 4.23 was found after treatment to contain 3.2% benzanilide on the weight of the fabric.

In addition to the spandex fibers described in the foregoing examples, other shaped articles prepared from segmented polyurethanes falling within the generic definition as set forth previously may be substituted therefor with like results. Other organic solvents for benzanilide as well as application adjuvants may likewise be utilized. Additional well-known dispersing agents will be found among those set forth in U.S. Patent 2,486,241.

As indicated in the examples, the spandex fibers may be treated alone or may be incorporated in fabrics with fibers of different compositions. For example, for purposes of economy, the benzanilide may be applied as a spin finish as the fiber is being extruded. While the treatment of fabrics containing other fibers as well as spandex fibers requires more of the treating agent, the other fibers are not adversely affected. Both natural and synthetic fibers, as well as blends thereof, may be included in the fabrics without impairing the stabilization of the spandex fibers.

The principal advantage attained by the present invention resides in providing spandex fibers which are stabilized against yellowing due to fume discoloration. Additional advantages reside in the ease of application of the material and the appreciable protection afforded by the stabilizer during normal use and care of fabrics containing the treated fibers.

As many widely different embodiments of this invention may be made without departing from the spirit and scope thereof, it is to be understood that this invention is not to be limited to the specific embodiments thereof except as defined in the appended claims.

We claim:

1. A spandex fiber stabilized against fume discoloration by having incorporated therein a stabilizing quantity of benzanilide.

2. The fiber of claim 1 wherein the benzanilide is present in an amount up to about 10% by weight of said fiber.

3. A fume-stabilized spandex fiber containing from about 1% to about 7% by weight of benzanilide.

4. A shaped article of a long-chain synthetic elastomer comprised of at least 85% of a segmented polyurethane stabilized against fume discoloration by the presence therein of a stabilizing quantity of benzanilide.

5. The shaped article of claim 4 wherein said polyurethane is prepared by chain extending an isocyanate-terminated polymeric intermediate with hydrazine.

6. The shaped article of claim 5 wherein the benzanilide is present in an amount up to about 10% by weight of said shaped article.

7. The shaped article of claim 6 wherein the benzanilide is present in an amount from about 1% to about 7% by weight of said shaped article.

8. The process for fume stabilizing spandex fibers which comprises applying thereto a treating composition containing benzanilide.

9. The process of claim 8 wherein the treating composition is comprised of an aqueous dispersion containing from about 1% to about 5% by weight of benzanilide.

10. The process for stabilizing shaped articles of a long-chain synthetic elastomer comprised of at least 85% of a segmented polyurethane against fume discoloration which comprises applying thereto a stabilizing quantity of benzanilide.

11. The process of claim 10 wherein the benzanilide is applied in the form of a solution.

12. The process of claim 10 wherein the benzanilide is applied in the form of an aqueous dispersion wherein the average particle size of the benzanilide is not coarser than about 100-mesh.

13. The process of claim 10 wherein said shaped articles are immersed in a treating bath containing said aqueous dispersion which is heated to a temperature from about 130° F. to about 180° F.

References Cited in the file of this patent

UNITED STATES PATENTS 2,929,804     Steuber _____ Mar. 22, 1960

OTHER REFERENCES

The Merck Index, Sixth Ed., page 124.

UNITED STATES PATENT OFFICE
CERTIFICATE OF CORRECTION

Patent No. 3,095,322            June 25, 1963

Jan Z. Sadowski et al.

It is certified that error appears in the above identified patent and that said Letters Patent are hereby corrected as shown below:

Column 2, lines 50 and 51, "Manufacturing Engineering and Equipment Company" should read -- Manufacturers Engineering and Equipment Corporation --; line 60, "b"=$42.34 \; G^{1/3} B^{1/3}$     should read     "b"=$42.34(G^{1/3} - B^{1/3})$ Signed and sealed this 2nd day of September 1969.

(SEAL)
Attest:

Edward M. Fletcher, Jr.            WILLIAM E. SCHUYLER, JR.
Attesting Officer                   Commissioner of Patents